Patented June 28, 1949

2,474,715

UNITED STATES PATENT OFFICE 2,474,715

PROCESS OF PREPARING SUBSTITUTED PROPIONIC ACIDS

Robert D. Babson, Rahway, N. J., assignor to Merck & Co., Inc., Rahway, N. J., a corporation of New Jersey No Drawing. Original application July 12, 1946, Serial No. 683,143. Divided and this application February 28, 1947, Serial No. 731,719

1 Claim. (Cl. 260—484)

This invention is concerned generally with novel chemical processes; more particularly it relates to an improved method for the manufacture of alkyl esters of α-halo-β,β-dialkoxy-propionic acid, useful in the preparation of α-formyl-phenaceturamide, a primary intermediate in the synthesis of penicillin.

This application is a division of my co-pending application Serial No. 683,143, filed July 12, 1946, now U. S. Patent 2,459,059.

It is now discovered, in accordance with the present invention, that alkyl esters of α-halo-β,β-dialkoxy-propionic acid (2) can be synthesized by reacting an alkyl β-acyloxy-acrylate (1) with a halogen and an aliphatic alcohol. This reaction may be chemically represented as follows:

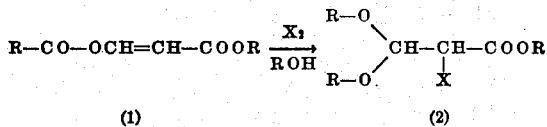

(1)             (2)

wherein R is alkyl, and X is halogen.

Compounds of this class can be converted to esters of α-phenacetamido-β,β-dialkoxy-propionate as follows: The alkyl α-halo-β,β-dialkoxy-propionate is hydrolyzed and the resulting α-halo-β,β-dialkoxy-propionic acid is heated with aqueous ammonia, whereby the α-halo substituent is converted to an α-amino group, the α-amino-β,β-dialkoxy propionic acid is then reacted with a phenacyl halide and the product esterified to produce the desired ester of α-phenacetamido-β,β-dialkoxy propionate. These reactions are described in detail in copending applications, Serial No. 728,724, filed February 14, 1947, and Serial No. 710,945, filed November 19, 1946. For example methyl acetate can be condensed with methyl formate and sodium to form methyl α-(sodio-formyl)-acetate; this can then be treated with acetyl chloride to produce methyl β-acetoxy-acrylate. When this compound is reacted with chlorine and methyl alcohol, and the product obtained treated as described in the above co-pending applications, the product is methyl α-phenacetamido-β,β-dimethoxy propionate. It is converted to α-formyl-phenaceturamide according to processes described in detail in copending application, Serial No. 636,516, filed December 21, 1945.

It is known that ethyl α-bromo-β,β-diethoxy-propionate can be prepared by reacting ethyl α-sodio formyl acetate with bromine and ethanol, but the yields obtainable according to this process have been limited to about 20% of theory. There is no indication in the prior art that an alkyl α-halo-β,β-dialkoxy-propionate could be prepared by treatment of an alkyl β-acyloxy-acrylate.

It is now discovered, according to the present invention, that alkyl β-acyloxy-acrylates can be reacted with a halogen and an aliphatic alcohol to produce the desired alkyl α-halo-β,β-dialkoxy propionate in yields of over 80% of theory. Moreover alkyl β-acyloxy-acrylates can be prepared in yields of approximately 60% of theory by reacting alkyl α-(metallo-formyl)-acetates with aliphatic acyl halides. It is thus possible according to my novel improved process to convert alkyl (α-metallo-formyl)-acetates to the corresponding alkyl α-halo-β,β-dialkoxy propionates in yields of approximately 50% of theory.

In carrying out the reaction, the alkyl β-acyloxy acrylate is dissolved in an aliphatic alcohol such as ethyl alcohol, methyl alcohol, butyl alcohol and the like; and a quantity of halogen such as chlorine, bromine and the like; substantially equimolecular to the acrylic acid derivative is added and allowed to react. It has been found that when chlorine and ethyl alcohol are employed, the reaction is substantially complete in approximately 15 hours. The reaction mixture is poured into an ether-water mixture, the ether extract is washed free of acid with water, dried and the ether evaporated. The residual oil is then distilled under reduced pressure to produce the corresponding alkyl α-halo-β,β-dialkoxy propionate, in substantially pure form.

The following example illustrates a method of carrying out the present invention, but it is to be understood that this example is given by way of illustration and not of limitation.

Example

A solution of about 100 g. of ethyl β-acetoxy-acrylate in about 190 g. of absolute ethanol is cooled to approximately —5° C.; about 45.2 g. of chlorine is added over approximately a 1 hour period and the resulting mixture is allowed to stand for approximately 15 hours at room temperature. The reaction product is poured into an equal volume of ice water mixed with about 200 cc. of ether, the layers are separated and the water is extracted once with ether. The combined ether extracts are washed free of water soluble acidic materials with ice water, dried over sodium sulfate and the ether evaporated under reduced pressure. The residual oil is vacuum distilled to produce approximately 117 g. of ethyl α-chloro-β,β-diethoxy-propionate; B. P. 87–91° C. at 3 mm.; $n^{25}=1.4252$; yield approximately 83% of theory based on ethyl β-acetoxy-acrylate.

Modifications may be made in carrying out the present invention without departing from the spirit and scope thereof and it is to be understood that the invention is to be limited only by the appended claim.

I claim:

The process which comprises reacting altogether ethyl β-acetoxy acrylate, chlorine and ethyl alcohol to produce ethyl α-chloro-β,β-diethoxy propionate.

ROBERT D. BABSON.

REFERENCES CITED

The following references are of record in the file of this patent:

Pechmann, "Ber. deut. chem.," vol. 25 (1892), pages 1048–1050.

Sugasawa, "Chem. Zemt," 1927, vol. II, page 1814.

Croshnik et al., "J. Am. Chem. Soc.," vol. 67 (May 1945), pages 722–723.

Merck Report 12d, February 18, 1944 (September 27, 1945), page 5.